United States Patent
Hinterberger et al.

(10) Patent No.: US 10,730,456 B2
(45) Date of Patent: Aug. 4, 2020

(54) ELECTRICALLY COUPLING A HIGH-VOLTAGE ON-BOARD ELECTRICAL SYSTEM TO A LOW-VOLTAGE ON-BOARD ELECTRICAL SYSTEM

(71) Applicant: AUDI AG, Ingolstadt (DE)

(72) Inventors: Michael Hinterberger, Großmehring (DE); Berthold Hellenthal, Schwanstetten (DE); André Blum, Gaimersheim (DE); Markus Fest, Schiltberg (DE)

(73) Assignee: AUDI AG, Ingolstadt (DE)

( * ) Notice: Subject to any disclaimer, the term of this patent is extended or adjusted under 35 U.S.C. 154(b) by 201 days.

(21) Appl. No.: 16/084,311

(22) PCT Filed: Sep. 26, 2017

(86) PCT No.: PCT/EP2017/074275
§ 371 (c)(1),
(2) Date: Sep. 12, 2018

(87) PCT Pub. No.: WO2018/082843
PCT Pub. Date: May 11, 2018

(65) Prior Publication Data
US 2019/0071033 A1 Mar. 7, 2019

(30) Foreign Application Priority Data
Nov. 3, 2016 (DE) .......................... 10 2016 221 514

(51) Int. Cl.
*B60R 16/023* (2006.01)
*B60R 16/033* (2006.01)
(Continued)

(52) U.S. Cl.
CPC ............ *B60R 16/023* (2013.01); *B60L 50/50* (2019.02); *B60R 16/033* (2013.01); *H01M 2/22* (2013.01); *B60L 2210/10* (2013.01); *H02M 3/02* (2013.01)

(58) Field of Classification Search
None
See application file for complete search history.

(56) References Cited

U.S. PATENT DOCUMENTS

| | | | | |
|---|---|---|---|---|
| 2012/0299378 A1* | 11/2012 | King | .......................... | B60L 1/00 307/18 |
| 2013/0026823 A1* | 1/2013 | Fetzer | ..................... | B60L 58/10 307/9.1 |
| 2017/0001585 A1* | 1/2017 | Fink | ........................ | B60R 16/04 |

FOREIGN PATENT DOCUMENTS

| CN | 102725169 A | 10/2012 |
|---|---|---|
| DE | 198 29 777 A1 | 1/2000 |

(Continued)

OTHER PUBLICATIONS

Office Action dated Dec. 2, 2019, in corresponding Chinese Application No. 201780026571.4 including partial machine-generated English language translation; 9 pages.

(Continued)

*Primary Examiner* — Jared Fureman
*Assistant Examiner* — Aqeel H Bukhari
(74) *Attorney, Agent, or Firm* — Maier & Maier, PLLC

(57) ABSTRACT

A method for operating an energy coupling device electrically coupling a high-voltage on-board electrical system designed for d.c. voltage to a low-voltage on-board electrical system designed for d.c. voltage, having a high-voltage energy converter connected to the high-voltage on-board electrical system and a low-voltage energy converter connected to the low-voltage on-board electrical system, which are electrically coupled by means of a d.c. voltage interme- (Continued)

diate circuit. The energy converters are controlled by a control unit. The degrees of conversion efficiency of the energy converters are ascertained and an intermediate circuit d.c. voltage of the d.c. voltage intermediate circuit is set as a function of a total degree of efficiency produced by the sum of the degrees of conversion efficiency in order to maximize the total degree of efficiency.

11 Claims, 9 Drawing Sheets

(51) Int. Cl.
    *H01M 2/22*    (2006.01)
    *B60L 50/50*    (2019.01)
    *H02M 3/02*    (2006.01)

(56) References Cited

FOREIGN PATENT DOCUMENTS

| | | |
|---|---|---|
| DE | 10 2007 013 308 A1 | 10/2008 |
| DE | 10 2008 044 662 A1 | 3/2010 |
| DE | 10 2009 046 501 A1 | 5/2011 |
| DE | 10 2011 014 811 A1 | 10/2011 |
| DE | 20 2012 005 893 U1 | 8/2012 |
| DE | 10 2012 221 670 A1 | 5/2014 |
| DE | 10 2014 203 250 A1 | 8/2015 |
| DE | 10 2014 205 650 A1 | 10/2015 |
| DE | 10 2014 205 652 A1 | 10/2015 |
| DE | 10 2014 210 337 A1 | 12/2015 |
| EP | 2 451 064 A2 | 5/2012 |

OTHER PUBLICATIONS

Notification of Transmittal of Translation of the International Preliminary Report on Patentability dated May 16, 2019, in connection with corresponding international Application No. PCT/EP2017/074275 (8 pgs.).

Examination Report dated Aug. 7, 2017 of corresponding German application No. 10 2016 221 514.0; 6 pgs.

International Search Report with English translation and Written Opinion of the International Search Authority dated Jan. 8, 2018 of corresponding International application No. PCT/EP2017/074275; 15 pgs.

* cited by examiner

ELECTRICALLY COUPLING A HIGH-VOLTAGE ON-BOARD ELECTRICAL SYSTEM TO A LOW-VOLTAGE ON-BOARD ELECTRICAL SYSTEM

FIELD

The invention relates to an energy coupling device for the power coupling of a high-voltage on-board electrical system designed for d.c. voltage to a d.c. voltage on-board electrical system designed for d.c. voltage, having a high-voltage terminal for connecting the energy coupling device to the high-voltage on-board electrical system, a low-voltage terminal for connecting the energy coupling device to the low-voltage on-board electrical system, a high-voltage energy converter, connected to the high-voltage terminal, a low-voltage energy converter connected to the low-voltage terminal, a d.c. voltage intermediate circuit, to which the high-voltage energy converter and the low-voltage energy converter are connected for electrically coupling the two energy converters, and a control unit for controlling the energy converters. The invention furthermore relates to a battery with a battery housing and at least two battery terminal poles arranged on the battery housing for connecting the battery to an on-board electrical system, having a plurality of battery cells that are arranged in the battery housing and that are mechanically connected to one another and electrically coupled to each other according to a specified connection diagram and are connected to the battery poles. The invention furthermore relates to a motor vehicle having a high-voltage on-board electrical system and a low-voltage on-board electrical system. Furthermore, the invention relates to a method for operating an energy coupling device electrically coupling a high-voltage on-board electrical system designed for d.c. voltage to a low-voltage on-board electrical system designed for d.c. voltage, having a high-voltage energy converter connected to the high-voltage on-board electrical system and a low-voltage energy converter connected to the low-voltage on-board electrical system, which are electrically coupled by means of a d.c. voltage intermediate circuit, wherein the energy converters are controlled by means of a control unit.

BACKGROUND

Energy coupling devices, motor vehicles with energy coupling devices as well as methods for their operation are extensively known in the prior art. They serve particularly for electrical coupling of electrical energy distribution networks such as the high-voltage on-board electrical system and the low-voltage on-board electrical system. In the present case, the focus is on d.c. voltage power distribution networks, wherein an electrical energy accumulator such as a type of battery is connected to at least one of the energy distribution networks. If the battery is a component of the high-voltage on-board electrical system, it is also known as a high-voltage battery.

Electrical energy distribution networks as well as the batteries for them find not only stationary applications, such as, for example, in uninterruptible power supply devices, electrical power supply devices in island operation, and/or similar instances, but also use in motor vehicles, and especially in electrically drivable motor vehicles, such as electric vehicles, hybrid vehicles, and the like.

Both the high-voltage on-board electrical system and the low-voltage on-board electrical system serve for the distributing of electrical energy between electrical units hooked up to the respective on-board electrical system, especially in a motor vehicle. Such electrical units may comprise, in addition to an electrical energy accumulator, such as the high-voltage battery of the high-voltage on-board electrical system or the like, electrical consumers, and/or the like, also an electrical energy source, such as a generator, a fuel cell, and/or the like, and also an electric drive mechanism, especially in the case of electrically drivable vehicles, which serves for the driving of the electrically drivable motor vehicle. Furthermore, a number of other electrical units may be involved, such as a lighting unit, headlights of the motor vehicle, interior lighting of the motor vehicle, and/or the like, but also other functional units such as a car radio, a navigation apparatus, an electrically operated air conditioning compressor, and/or the like.

An energy coupling device of this kind is known for example from DE 10 2014 205 650 A1. This discloses a two-stage d.c. voltage converter with power scaling. For this purpose, a circuit arrangement is provided at the high voltage side, comprising a plurality of parallel-connected boost-buck controllers. By means of the circuit arrangement at the high voltage side, a voltage matching from a high voltage side to a medium d.c. voltage is produced. By means of the circuit arrangement at the high voltage side, the medium d.c. voltage is held at a constant value. A circuit arrangement at the low voltage side is connected to the medium d.c. voltage, providing an electrical coupling of the medium d.c. voltage to a d.c. voltage at the low voltage side. The circuit arrangement at the low voltage side works with a fixed clock frequency at a working point having substantially a fixed transmission ratio.

Furthermore, DE 10 2009 046 501 A1 discloses a battery system with DC/DC converters. DE 10 2014 205 652 A1 moreover discloses a modulation method for a booster operation of a push-pull converter and DE 198 29 777 A1 discloses a DC/DC converter.

Even though the prior art has proven itself, there continues to be a need for improvement. Namely, it has been shown that the use of high-voltage batteries is undergoing constant development, especially improvement. In this way, it becomes possible to use high-voltage batteries also in fields which were heretofore reserved for other battery technologies, such as those based on lead acid batteries or the like. In particular, it is desirable to replace battery technologies with little future prospect, such as the lead acid battery or the like, with new technologies, such as those based on lithium ion technology or the like. The teaching of DE 10 2014 205 650 A1 proves to be a drawback here, since only slight efficiencies can be achieved especially in the partial load range. Yet the partial load range has proven to be a frequent operating condition. Also for this reason, neither has the teaching of DE 10 2014 205 650 A1 become widespread.

SUMMARY

Thus, the object of the invention is to provide an energy coupling device that enables an improved energy coupling and thereby in particular makes possible an easy changeover of technology in regard to a battery technology.

The invention proposes to achieve this object with an energy coupling device, a battery, a motor vehicle as well as a method.

In regard to an energy coupling device of this kind it is proposed in particular that the control unit is designed to ascertain degrees of conversion efficiency of the energy converters and to set an intermediate circuit d.c. voltage of the d.c. voltage intermediate circuit on the basis of a total degree of efficiency produced by the sum of the degrees of conversion efficiency in order to maximize the total degree of efficiency.

As for the battery, it is proposed in particular that the battery comprises an energy coupling device of the invention, which is arranged in the battery housing.

As for the motor vehicle, it is proposed in particular that the motor vehicle comprises an energy coupling device according to the invention or a battery according to the invention.

In regard to the method, it is proposed in particular that the degrees of conversion efficiency of the energy converters are ascertained and an intermediate circuit d.c. voltage of the d.c. voltage intermediate circuit is set on the basis of a total degree of efficiency produced by the sum of the degrees of conversion efficiency in order to maximize the total degree of efficiency.

The invention is based on the idea that the operation especially in the important partial load range can be significantly improved by taking account of all degrees of efficiency, so that the utilization of the energy coupling device can be improved. For this, the invention makes use of the finding that the individual degrees of conversion efficiency especially in the partial load range are dependent on a magnitude of a value of the intermediate circuit d.c. voltage. The resulting effects can be utilized in particular to advantageously provide a higher energy density of the battery by a new technology during a changeover of technologies. For example, structural space for the energy coupling device can also be provided in this way, which is used to adapt this battery with the new technology to an existing electrical installation, especially that of the motor vehicle. Preferably in this way an existing battery technology can be replaced by another, especially a newer battery technology. Especially when standardized designs or battery housings are used, it can be provided that already existing devices or motor vehicles can be easily retrofitted to a new battery technology. Preferably, the invention relates to the fact that innovative high-voltage batteries based on lithium ion technology can be made usable for a multitude of applications in which a changeover would otherwise involve a high cost of development and expenditures. But the invention is not limited to this and it may fundamentally be used for on-board electrical systems which are coupled together.

The invention utilizes the finding that an optimized total degree of efficiency can be achieved by providing the d.c. voltage intermediate circuit with the adjustable intermediate circuit d.c. voltage, so that even at high integration density, especially when the energy coupling device is arranged in a battery housing of the high-voltage battery or the like, a dependable and sensible operation can be assured.

This can be accomplished because—unlike what is customary in the prior art—the intermediate circuit d.c. voltage in the invention is not constant, but instead variable, so that a total degree of efficiency of the energy coupling device can be maximized in dependence on the conversion performance of the energy converter. This has not only the benefit of high energy utilization, but also the benefit of low losses, which often accrue in the form of heat, and may have very detrimental effects especially for batteries, and also in particular for high-voltage batteries. A cooling which is provided for the battery can be reduced or even eliminated in this way, especially when the energy coupling device is integrated in a battery housing. Sometimes the invention can even make a corresponding use of high-voltage batteries possible for the first time. Moreover, in this way the invention also avoids the need for complex circuit arrangements at the high voltage side, especially parallel-connected boost-buck controllers. Namely, this proves to be a disadvantage not only in terms of efficiency, but also requires a corresponding design and control system expenditure, which may prove to be an obstacle especially for a technology changeover in regard to batteries. The energy converters are preferably designed for a bidirectional energy coupling. The energy converters may be designed at least partly as DC/DC converters. Preferably, the DC/DC converter is likewise designed for a bidirectional energy coupling. It may furthermore be designed as a boost converter (booster) and/or as a buck converter (buck).

For a technology changeover involving batteries, moreover, it proves to be advantageous in many areas of application for the housings of the batteries and their electrical connections to be standardized. This makes it possible to employ increasingly more novel battery concepts especially for high-voltage batteries in existing systems, especially motor vehicles of this kind, in order to improve the performance of the particular layout of the device or the motor vehicle.

The energy coupling device may be provided as an individually manageable unit. Furthermore, it may also have a modular design, in particular, where at least one of the two energy converters can be secured removably by means of an electromechanical connection device in or also on the energy coupling device.

Preferably, the high-voltage on-board electrical system is an on-board electrical system which comprises a high-voltage battery. High-voltage means in particular a d.c. voltage which is dictated by a standard such as ECE R 100, for example an electrical d.c. voltage of more than 60 V. According to this standard, special measures must be taken to protect people against electric shock. In particular, the term high-voltage encompasses a d.c. voltage greater than 120 V. In the sense of this disclosure, a low voltage is a d.c. voltage less than 120 V, especially less than 80 V.

The low-voltage on-board electrical system may be designed for a rated voltage of 12 V, 24 V, 48 V or also 60 V, for example, or also for another electrical d.c. voltage. Often the rated voltage for the low-voltage on-board electrical system is 60 V or less, so that the strict safety measures required in the aforementioned standard can be avoided. The low-voltage on-board electrical system therefore often comprises electrical units, especially electrical consumers, which only require a low electric power, such as a car radio, a navigation unit, a motor vehicle interior lighting, a motor vehicle headlight and/or the like. In the present case, however, the low-voltage on-board electrical system may also include an electric drive mechanism for the electrically propelled motor vehicle.

The high-voltage on-board electrical system preferably comprises at least the high-voltage battery. Furthermore, there may of course also be provided further electrical units or electrical consumers on the high-voltage on-board electrical system. One important aspect of the invention, however, is to make possible the use of a new battery technology for existing electrical installations or devices, making use of high-voltage batteries. A high-voltage battery in the sense of this disclosure is a battery which is designed for a rated voltage of more than 120 V. Preferably, the high-voltage battery is designed for a rated voltage of 400 V, especially 800 V. The high-voltage battery is preferably a battery which uses lithium ion based battery cells.

The energy coupling device comprises a high-voltage terminal for connecting the high-voltage on-board electrical system. If the energy coupling device is integrated in the high-voltage on-board electrical system, for example in the high-voltage battery, the high-voltage terminal can of course likewise be integrated there, or it may be omitted. The same holds of course basically for the low-voltage on-board electrical system.

Both the high-voltage energy converter and the low-voltage energy converter may each be formed by a DC/DC converter. It is especially advantageous for the high-voltage energy converter to comprise at the same time a galvanic isolating unit, so that the d.c. voltage intermediate circuit is galvanically isolated from the high-voltage on-board electrical system. In this way, a better security can be achieved in terms of electrical safety. Basically, of course, this may also be provided for the low-voltage energy converter.

The d.c. voltage intermediate circuit serves, among other things, for electrically coupling the high-voltage energy converter to the low-voltage energy converter. For this reason, the two energy converters are hooked up to the d.c. voltage intermediate circuit. The energy coupling device moreover comprises a control unit for controlling the energy converters, namely, at least the high-voltage energy converter and the low-voltage energy converter. With the control unit, it is advantageously possible to set the power which is converted by the high-voltage energy converter and the low-voltage energy converter. At the same time, it serves for setting the intermediate circuit d.c. voltage of the d.c. voltage intermediate circuit. This may be done, for example, by suitable controlling of the energy converters. The intermediate circuit d.c. voltage may advantageously be a d.c. voltage of less than roughly 120 V, preferably less than roughly 100 V. Especially preferably, however, it is somewhat larger than the low voltage of the low-voltage on-board electrical system.

The control unit is moreover designed to ascertain the degrees of conversion efficiency of the energy converters. Preferably, it is designed to ascertain the degree of conversion efficiency of the high-voltage energy converter and the low-voltage energy converter. For this purpose, sensors may be provided accordingly, which make it possible to ascertain the respective degrees of conversion efficiency from sensor signals delivered. The control unit then ascertains a total of the degrees of conversion efficiency, forming a total degree of efficiency. By suitable control of the intermediate circuit d.c. voltage of the d.c. voltage intermediate circuit, the degrees of conversion efficiency of the two energy converters can be influenced. In this process, the control unit controls the intermediate circuit voltage such that the total degree of efficiency is maximized. The control of the intermediate circuit d.c. voltage may additionally occur by using characteristic curve fields or already collected determinations of the degrees of efficiency. Of course, these data and/or parameters may also be updated during the proper operation of the energy coupling device, for example in order to better allow for changes in the respective degrees of conversion efficiency due to aging, temperature influences, and/or the like. For example, the control of the intermediate circuit d.c. voltage may be done in a way such that the control unit controls a converted electric power of the energy converters.

Thus, on the whole, with the invention one may improve the utilization of an energy coupling device so that so a technology changeover in regard to a battery technology can be made possible or facilitated.

Preferably the control unit is designed to regulate the low-voltage energy converter on the basis of the intermediate circuit d.c. voltage. The regulating of the d.c. voltage of the low-voltage on-board electrical system is thus not based on the d.c. voltage at the high-voltage on-board electrical system, but merely on the intermediate circuit d.c. voltage. In this way, of course, an energy transfer, especially a bidirectional energy transfer, can be improved. At the same time, this has the effect that the particular current setting of the intermediate circuit d.c. voltage can serve as the basis for the regulating. Moreover, this configuration makes it possible to hook up several low-voltage energy converters for different applications to the d.c. voltage intermediate circuit and to operate them almost independently of each other. This makes is possible not only to couple electrically the low-voltage on-board electrical system to the high-voltage on-board electrical system, but also at the same time to couple electrically further electrical energy sources or energy sinks by means of further low-voltage energy converters to the d.c. voltage intermediate circuit.

Preferably at least the low-voltage energy converter is designed as an individually manageable unit, which can be mechanically and electrically connected to the energy coupling device in modular fashion. In this way, it is possible to retrofit the energy coupling device easily for the most diverse of applications. Standardized components may be produced for the energy coupling device, which can be assembled as needed for individual applications. Thus, the possibility exists of using adapted low-voltage energy converters for different d.c. voltages of different low-voltage on-board electrical systems and to arrange them by the plug-and-play principle alternatively at a corresponding slot of the energy coupling device. Preferably, these low-voltage energy converters then also contain standardized communication interfaces, which allow the control unit to recognize them and control them appropriately. Basically, the same also holds for the high-voltage energy converter, which is adapted in its design to the respective rated voltage or the particular high-voltage battery used on the high voltage side. Furthermore, the energy converters may also be chosen according to the required power and be provided in the energy coupling device. In this way, a highly flexible modular system is provided for the energy coupling device, making it possible to provide specially adapted energy coupling devices with little expense.

For this purpose, it may be provided moreover that the energy coupling device comprises a housing, in which at least the high-voltage energy converter and the low-voltage energy converter are arranged and which comprises at least one slot for the low-voltage energy converter for the reversible electrical and mechanical connection of the low-voltage energy converter.

According to one enhancement it is proposed that the energy coupling device comprises at least one further low-voltage energy converter connectible to the d.c. voltage intermediate circuit for the electrical coupling of an outside electrical energy source. In this way, it is easily possible to hook up additional outside energy sources to the energy coupling device and to couple them electrically, such as a solar cell layout, a quick charging column, a wireless charging device, a standardized wired connection feature and/or the like. Preferably, the further energy converters are also designed for a bidirectional energy coupling. The further energy converter can be both a high-voltage energy converter and a low-voltage energy converter, according to which voltage is provided by the outside energy source. In the most simple instance, the energy converter may also comprise only a rectifier, which uses a public energy supply network as the energy source and provides the energy obtained from it across the energy coupling device. For this purpose, the rectifier is moreover hooked up to a DC/DC converter, which in turn is hooked up to the d.c. voltage intermediate circuit.

In a motor vehicle it may moreover be provided that a high-voltage energy converter and at least one low-voltage energy converter of the energy coupling device are arranged spatially at a physical distance from each other. This makes it possible to arrange the energy coupling device even in very limited space, for example in the motor vehicle. In this case, separate housings may also be provided for at least some of the energy converters.

Moreover, in regard to the method, it is proposed that the control unit is used to set a clock frequency of the high-voltage energy converter and/or at least one low-voltage energy converter on the basis of the intermediate circuit d.c. voltage. In this way, it is possible to influence the conversion degrees of the energy converters.

Furthermore, it is proposed that an energy flow between the energy converters is controlled by means of the control unit. The intermediate circuit d.c. voltage can be set in this way. In particular, a conversion performance can be set.

The above described advantages and effects hold not only for the energy coupling device according to the invention, but also for the battery outfitted with the energy coupling device according to the invention and the motor vehicle outfitted with the energy coupling device according to the invention or the motor vehicle outfitted with the battery according to the invention and for the method according to the invention, and vice versa.

BRIEF DESCRIPTION OF THE DRAWINGS

In the following, the invention shall be further explained with the aid of exemplary embodiments making reference to the accompanying figures. In the figures, the same reference numbers denote the same features and functions. The exemplary embodiments are meant to further explain the invention and not to limit the idea of the invention.

There are shown.

DETAILED DESCRIPTION

The following exemplary embodiments pertain to an application in an industrial truck such as a fork lift or the like, in which an existing lead acid battery is to be replaced by a lithium ion battery. However, the invention is basically not limited to this application.

A battery serves basically for storing energy in reversible manner. Such a battery is also known as an accumulator. For purposes of the reversible energy storage, the battery generally comprises several battery cells, designed as galvanic cells and able to chemically store electrical energy. For this purpose, a respective battery cell generally comprises two electrodes, which stand in electrochemical connection with each other, for example across an electrolyte, which interacts with the electrodes. An electrical d.c. voltage is then established at the electrodes, which essentially results from the electrochemistry. The d.c. voltage established between the electrodes of the individual battery cell usually amounts to a few volts, such as 1.2 V to 4.5 V, depending on the cell chemistry.

Batteries of this kind, especially high-voltage batteries, should however often provide high d.c. voltages, for example in electrically propelled motor vehicles a d.c. voltage in the range of several 100 V, such as around 400 V or more, particularly around 800 V. Hence, in order to realize such d.c. voltages by a battery, many battery cells need to be switched electrically in series. Depending on the energy or power demand, a parallel connection of battery cells may also be required in addition. Even through these considerations are generally applicable to high-voltage batteries, they may also be transferred essentially to batteries which are used in the field of low-voltage on-board electrical systems and which are adapted in design for the given voltage ranges, such as a voltage of 12 V, 24 V, 48 V, 60 V, or in special applications such as that of industrial trucks, in the range of 80 V.

Especially for electrically operated industrial trucks as the electric vehicle it is generally provided that an electrical energy supply comes from a battery 12 which is designed as a lead acid battery. A voltage range for on-board electrical systems with such batteries 12 extends, for example, from around 12 V to around 80 V. Such batteries 12 are standardized in regard to their mechanical and/or electrical properties and are offered by various companies. The corresponding battery voltage is present directly at the battery terminal poles of such a battery 12. The battery terminal poles are connected to an electrical installation, such as that of the industrial truck, which comprises for example a driving mechanism for the industrial truck 10, besides electrical units.

Figure 1:
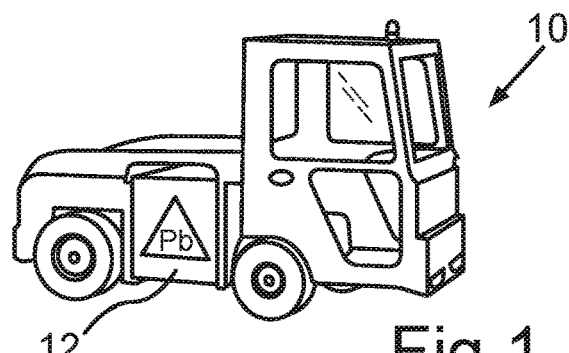
FIG. 1 an industrial truck as an electric vehicle according to the prior art with a lead acid accumulator.
Figure 2:
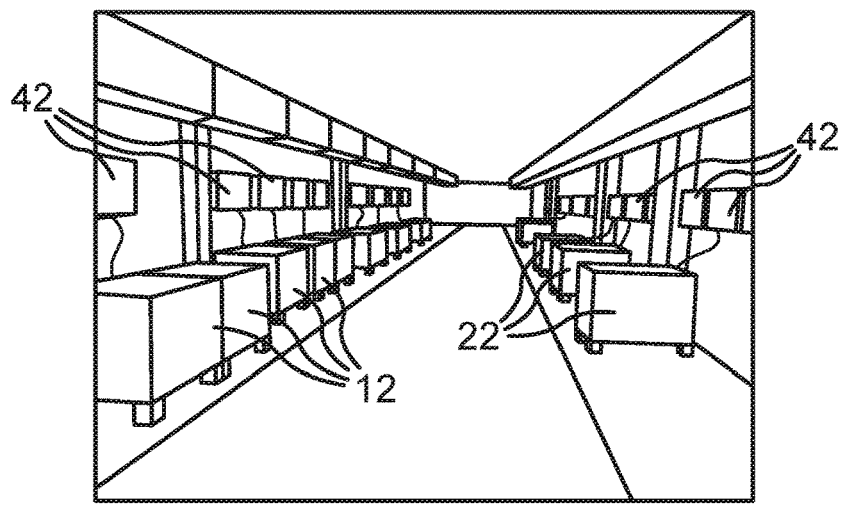
FIG. 2 a first charging station for accumulators of the industrial truck of FIG. 1.
Figure 3:
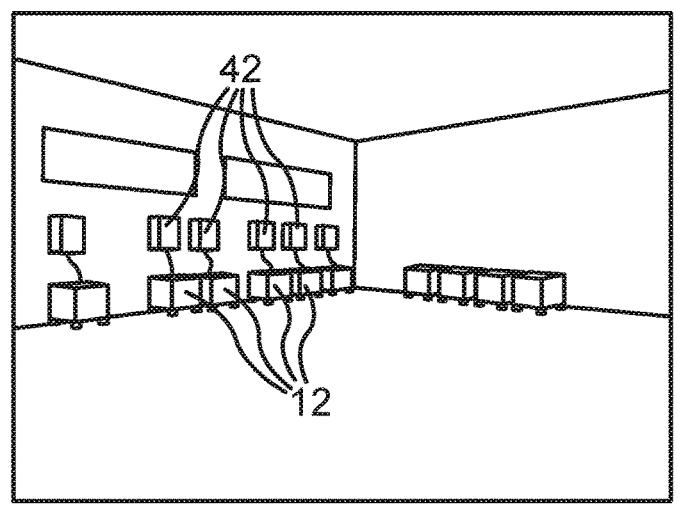
FIG. 3 a second charging station for accumulators of the industrial truck of FIG. 1.

FIG. 1 shows in an exemplary representation an industrial truck 10 as an electrically propelled motor vehicle, which in the present instance is an electric vehicle. The industrial truck 10 comprises an interchangeable lead acid accumulator. In this configuration, the industrial truck 10 is considered to belong to the prior art. The industrial truck 10 is used in materials handling and logistics, especially at industrial enterprises, and especially in the field of warehousing and production provisioning. FIGS. 2 and 3 show in schematic views charging stations 42 in rooms (not shown) where the accumulators 12 are situated. Each time an accumulator 12 is hooked up to one of the charging stations 42 for electrical charging.

The accumulators 12 are arranged interchangeably in the industrial trucks 10 so that the operational readiness of the industrial trucks 10 is influenced as little as possible by the charge state of the accumulators 12 arranged in it. The replacement of the accumulator 12 as well as the hooking up to the charging station 42 occurs manually and is thus costly and time consuming.

The electrical installation of the industrial truck 10 in the present instance is designed for a rated voltage of around 80 V. Occasionally, it may also amount to around 120 V. The battery 12 of this kind of industrial truck 10 is generally designed as a lead acid battery and has an electrical capacity of up to roughly 540 Ah, for example, so that the stored quantity of electrical energy is around 43 kWh. The battery 12 of the industrial truck 10 is designed so that it can provide large currents in the short term. Limiting elements in this regard are a safety unit, as well as an electrical plug connector, which is typically designed for an electric current of around 320 A. This is a standardized plug connector, making it possible to change the batteries 12 whenever desired for purposes of charging and to connect to the chargers 42. In continuous operation, it may be provided that the battery 12 provides a power of up to around 20 kW.

The industrial truck 10 in the present case furthermore has a separate 12 V on-board electrical system, to which a typical 12 V lead acid battery 90 is connected. With this on-board electrical system, low-power consumers can be supplied with electrical energy. The 12 V lead acid battery 90, however, is not absolutely essential to operating the 12 V on-board electrical system. It may also be provided simply by a suitable DC/DC converter.

Not only in industrial trucks, but also in motor vehicles in general it is generally provided that kinetic energy can be recovered by means of recuperation as electrical energy and stored in the battery.

In the known industrial trucks 10 it has proven to be a hindrance that these can generally be operated only for two shifts of 8 hours, after which a correspondingly long charging phase for the battery 12 of around 7 to 8 hours is required. During such a charging phase, the battery 12 cannot be used. Furthermore, it has proven to be a drawback that the use of the lead acid batteries 12 requires a corresponding suction device for hydrogen gas, which is liberated during the charging of such batteries 12. Since the batteries 12 are standardized in terms of their dimensions and connection devices, they can be taken out of the vehicle 10 and delivered to the charging device 42 for purposes of the charging. But this is time consuming and labor intensive. Furthermore, it is often necessary to provide more batteries 12 than there are industrial trucks 10. This may be necessary to ensure a given availability of the industrial trucks 10, since otherwise the availability might be limited on account of the time needed for the charging of the batteries 12. The battery surplus in terms of the number of batteries 12 as compared to the number of industrial trucks 10 may for example amount to 40% to 50% or even more.

The use of lead acid batteries, especially in industrial trucks, also proves to be particularly disadvantageous because they need to be produced in comparatively small production lots adapted to industrial trucks. Furthermore, the long charging time proves to be a drawback. Finally, it must be kept in mind that the use of lead may involve limitations in future, since lead is an environmental toxin. Moreover, there are large expenditures in regard to the infrastructure required for the use of the lead acid battery 12, especially in terms of the corresponding floor space needed for the charging stations 42, locations, and/or the like, as can be seen from FIGS. 2 and 3.

Figure 4:
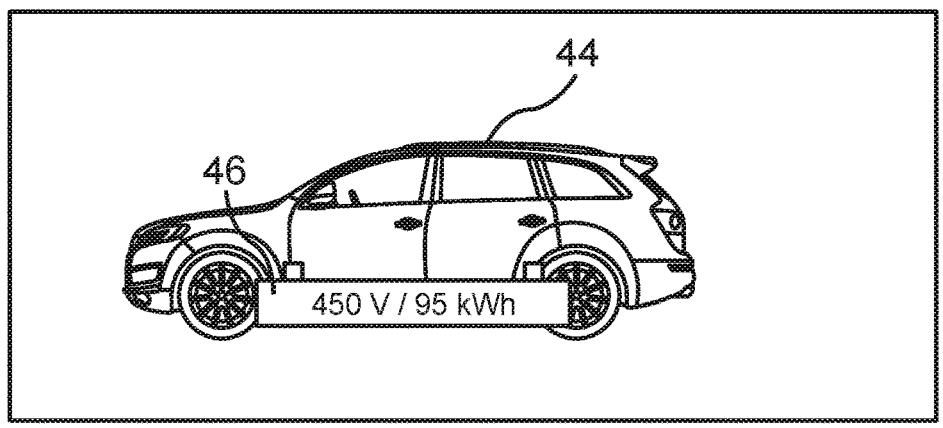
FIG. 4 a schematic diagram of an electrically propelled car with a lithium ion accumulator.

FIG. 4 shows in a schematic view an electrically propelled passenger car 44, which is likewise an electric vehicle, and comprising a high-voltage battery 46 for its proper operation on the basis of a new lithium ion technology. The high-voltage battery 46 has a plurality of battery cells, not shown, which are connected such that a d.c. voltage of around 450 V is present at terminal poles of the high-voltage battery 46, not shown. The high-voltage battery 46 in the present instance is designed for an energy of around 95 kWh, for example.

Figure 5:
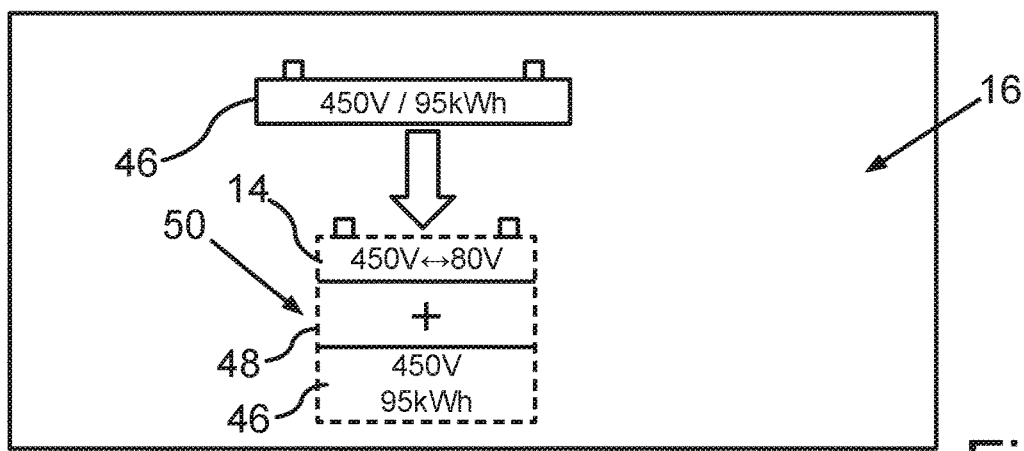
FIG. 5 a schematic representation for an adapting of the accumulator of the car of FIG. 4 to an accumulator for the industrial truck of FIG. 1.

FIG. 5 shows in a schematic representation how the high-voltage battery 46 of FIG. 4 can be utilized to replace the accumulator 12 of the industrial truck 10 of FIG. 1. For this, the high-voltage battery 46 is installed in a housing 48, in which furthermore an energy coupling device 14 is installed. The housing 48 has the same dimensions as the battery 12. These dimensions are standardized, in the present case.

Figure 6:
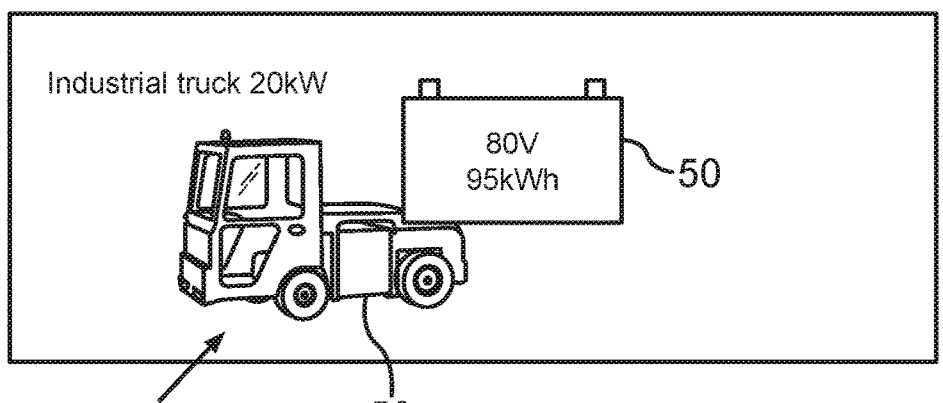
FIG. 6 a schematic representation of the industrial truck of FIG. 1 with an accumulator according to FIG. 5.

With the energy coupling device 14, an energy coupling is carried out such that the d.c. voltage provided by the high-voltage battery 46 is converted to a level corresponding to the d.c. voltage provided by the accumulator 12. This voltage in the present instance is around 80 V. Furthermore, the energy coupling device 14 may also be designed, of course, to provide further voltages, especially d.c. voltages, such as 12 V, 24 V, 48 V and/or the like. The energy coupling device 14 may be suitably adapted in this regard, as shall be further explained below. Thanks to the housing 48, a power supply device 50 is formed which can be handled as an individually manageable unit, like the accumulator 12. FIG. 6 shows the industrial truck 10 with the power supply device 50 of FIG. 5.

The invention utilizes the development of high-voltage battery systems for vehicle designs especially in the area of passenger cars. The battery systems developed here may be transferred to alternative designs, especially if adaptations are made in accordance with the invention, so that many further application possibilities are opened up. FIG. 4 shows in schematic representation a high-voltage battery system based on the high-voltage battery 46, having a plurality of individual components such as a battery vehicle housing, lithium ion battery modules, in the present instance 36 units for example, a battery management unit, a cooling system, a module connector, cables, bus bars, plug connectors and the like. For usage in the industrial truck 10, all necessary components of the high-voltage battery 46 are utilized and integrated in a new housing, namely, the housing 48. As a result, one gets a high-voltage battery system in a different housing, corresponding in its dimensions to those of the battery 12.

Figure 7:
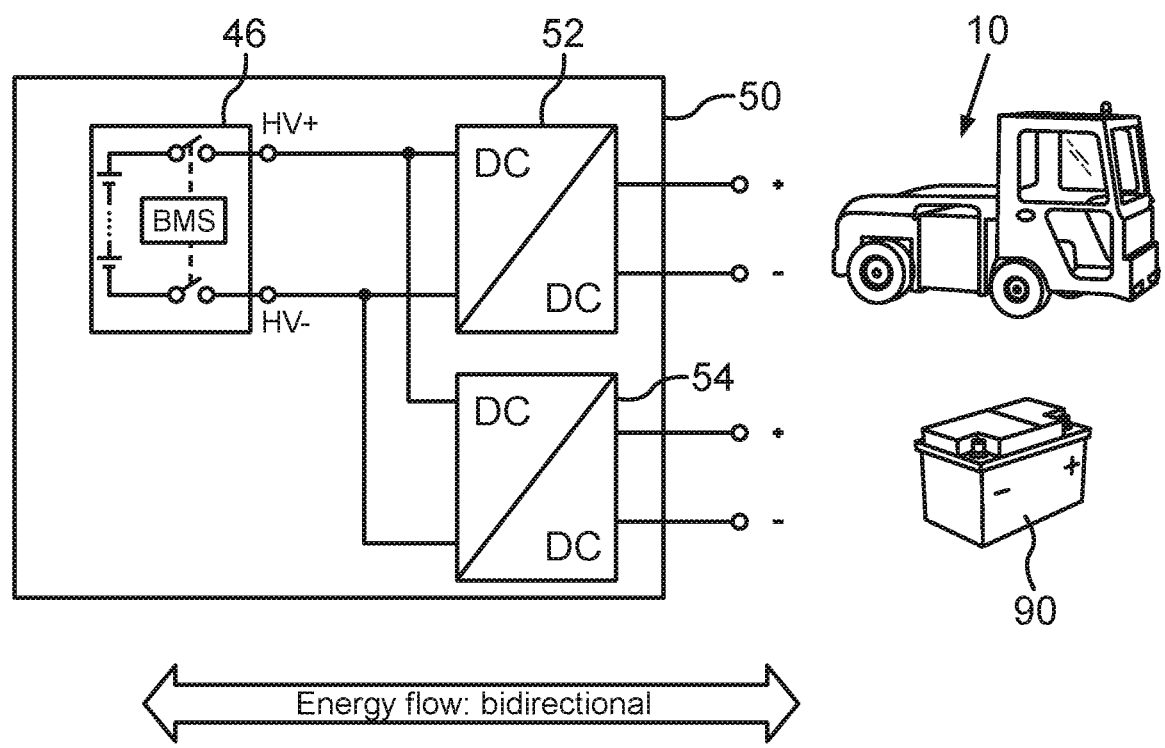
FIG. 7 in a schematic block diagram representation, a layout for the accumulator as is provided in the industrial truck of FIG. 6.
Figure 8:
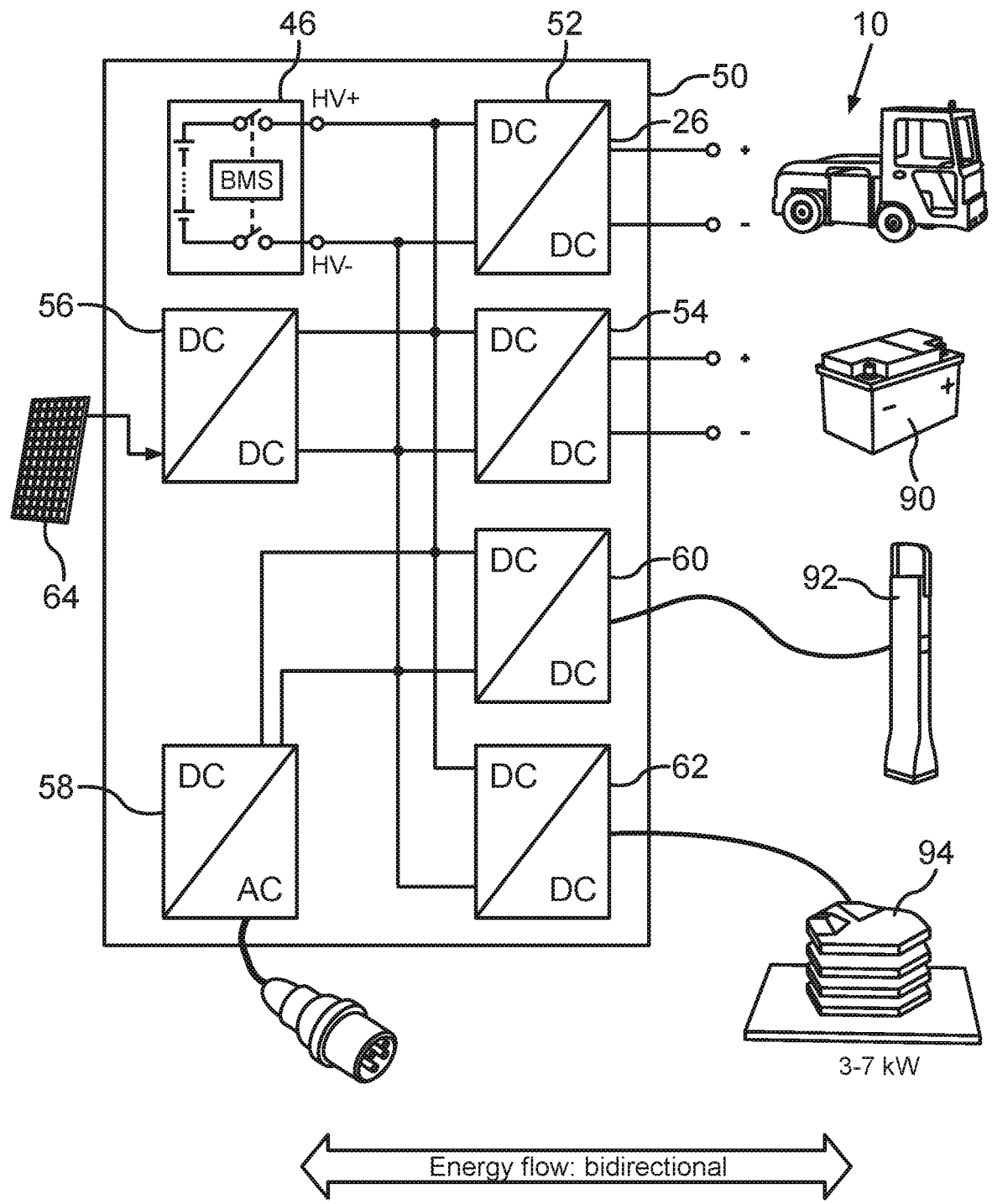
FIG. 8 a schematic block diagram for an accumulator according to FIG. 7, having a modular design and being expandable with further energy converters.

In order for this newly created high-voltage battery system to be suitable for use in the industrial truck 10, it is necessary to provide an electrical d.c. voltage of around 80 V. Usually the industrial truck 10 is operated with this d.c. voltage. In addition, of course, there may also be departures in regard to the voltages, for example, the industrial truck in alternative configurations may also use an operating voltage of 60 V or also 120 V. For this reason, an energy coupling device 14 is provided in the housing 46. This carries out a voltage conversion from the high voltage side to the low voltage side, that is, from around 450 V to around 80 V in the present case. For this purpose, a DC/DC converter is used. Preferably, the DC/DC converter is bidirectional, so that recuperation energy can be stored back in the high-voltage battery 46. In FIGS. 7 and 8, this is denoted for example with the arrow "energy flow bidirectional".

In this way, an individually manageable unit is created, namely, the power supply device 50, which is suited to simply replacing the accumulator 12. Advantageously, corresponding controllers which are optimized for the operation of the battery 12 are adapted in their operation to the new battery system.

In the present case, the high-voltage battery is a lithium ion battery, which is able to provide twice as much energy with the aforementioned energy capacity and the same volume as is possible with the battery 12. Furthermore, the unfavorable lead acid battery system with its drawbacks, especially in regard to environmental compatibility and the releasing of oxyhydrogen gas during the charging process, can also be avoided.

FIG. 7 shows in a schematic block diagram representation the layout of the power supply device 50 of FIG. 5. It is evident from FIG. 7 that the high-voltage battery 46 is connected by its two terminals to two DC/DC converters 52, 54, each of them providing a d.c. voltage of 80 V or 12 V. In this way, all electrical devices in the industrial truck 10 can be operated as usual.

FIG. 8 shows an enhancement of the power supply device 50 of FIG. 7, in which further DC/DC converters or AC/DC converters are hooked up to the high-voltage battery 46, such as the energy converters 54, 56, 58, 60, 62. With these energy converters, it is possible to integrate further electrical devices into the power supply device 50 and thereby further improve its diversity in terms of use. Thus, for example, it is possible to use the DC/DC converter 60 to electrically couple a DC/DC charging column 92, which can provide for example a charging power of 150 kW. In this way, it is possible to recharge the high-voltage battery 46 very quickly, so that the parked time of the industrial truck 10 can be kept as low as possible. Moreover, this can also be accomplished with the DC/DC converter 62, which is designed for a wireless energy coupling. For this purpose, an induction coil 94 is arranged on the bottom of the industrial truck 10. If the industrial truck 10 is parked above a mating coil arranged in the floor, energy can be supplied wirelessly in this way to the high-voltage battery 46. No separate electromechanical coupling is needed. If a sufficient number of charging stations of this kind are present, an almost continuous operation of the industrial truck 10 will be achieved. Furthermore, the possibility also exists of using the DC/DC converter 56 to connect a solar panel 64, which is arranged for example on the roof of the industrial truck 10. In this way, it is possible to keep the high-voltage battery 46 permanently charged by appropriate luminous radiation, especially during the day and when the industrial truck 10 is operated outdoors, when the solar panel is exposed to sunlight. Furthermore, of course, an AC/DC converter 58 may also be provided, by means of which the industrial truck can be connected to a typical three-phase alternating voltage grid, such as is provided in factory halls and the like by the public power supply grid.

Figure 9:
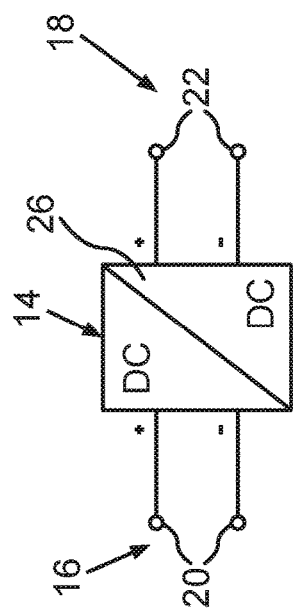
FIG. 9 a schematic principle block diagram for the basic function of the energy coupling device according to a first embodiment of the invention.
Figure 12:
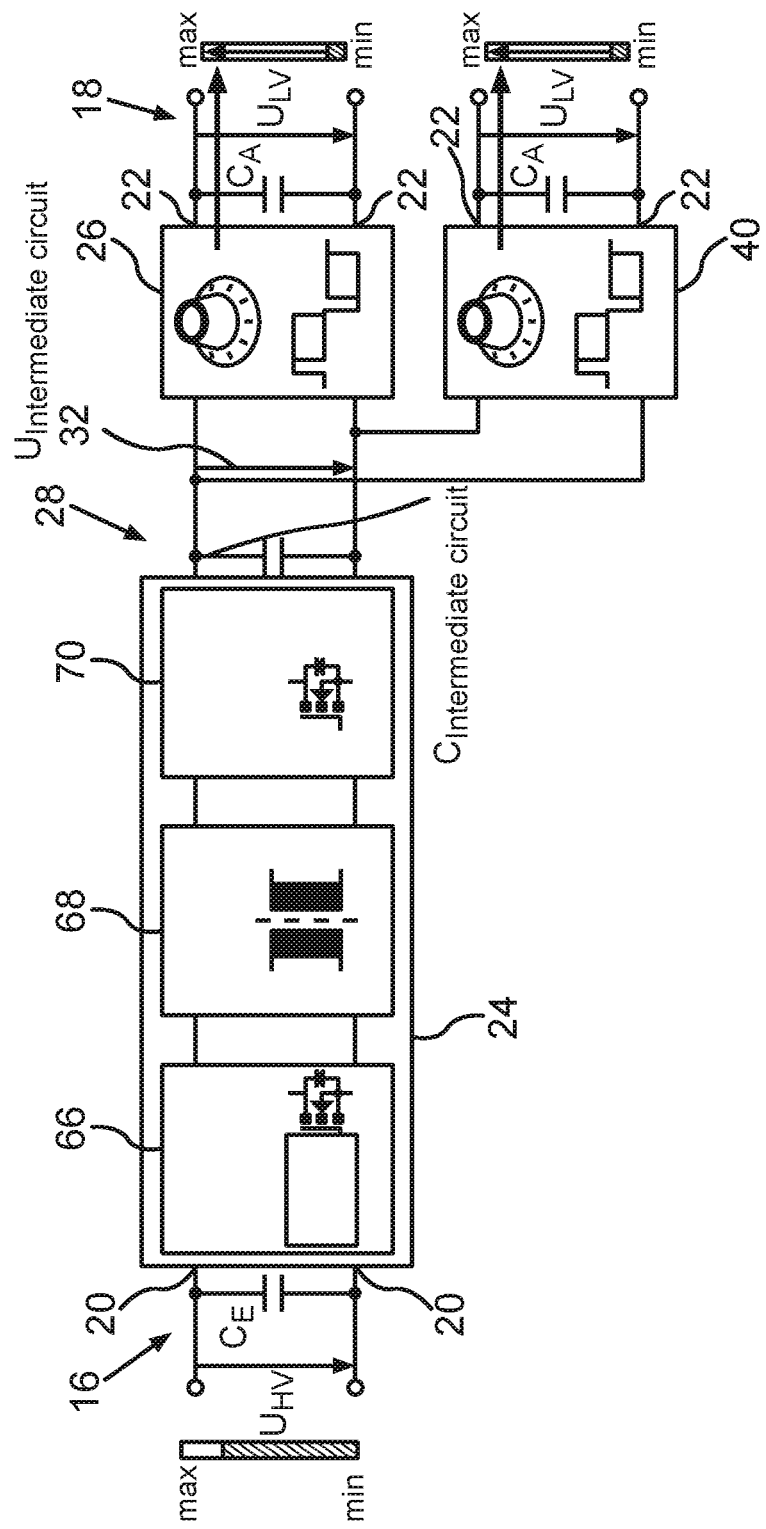
FIG. 12 a schematic block diagram representation of the energy coupling device of FIG. 11.
Figure 14:
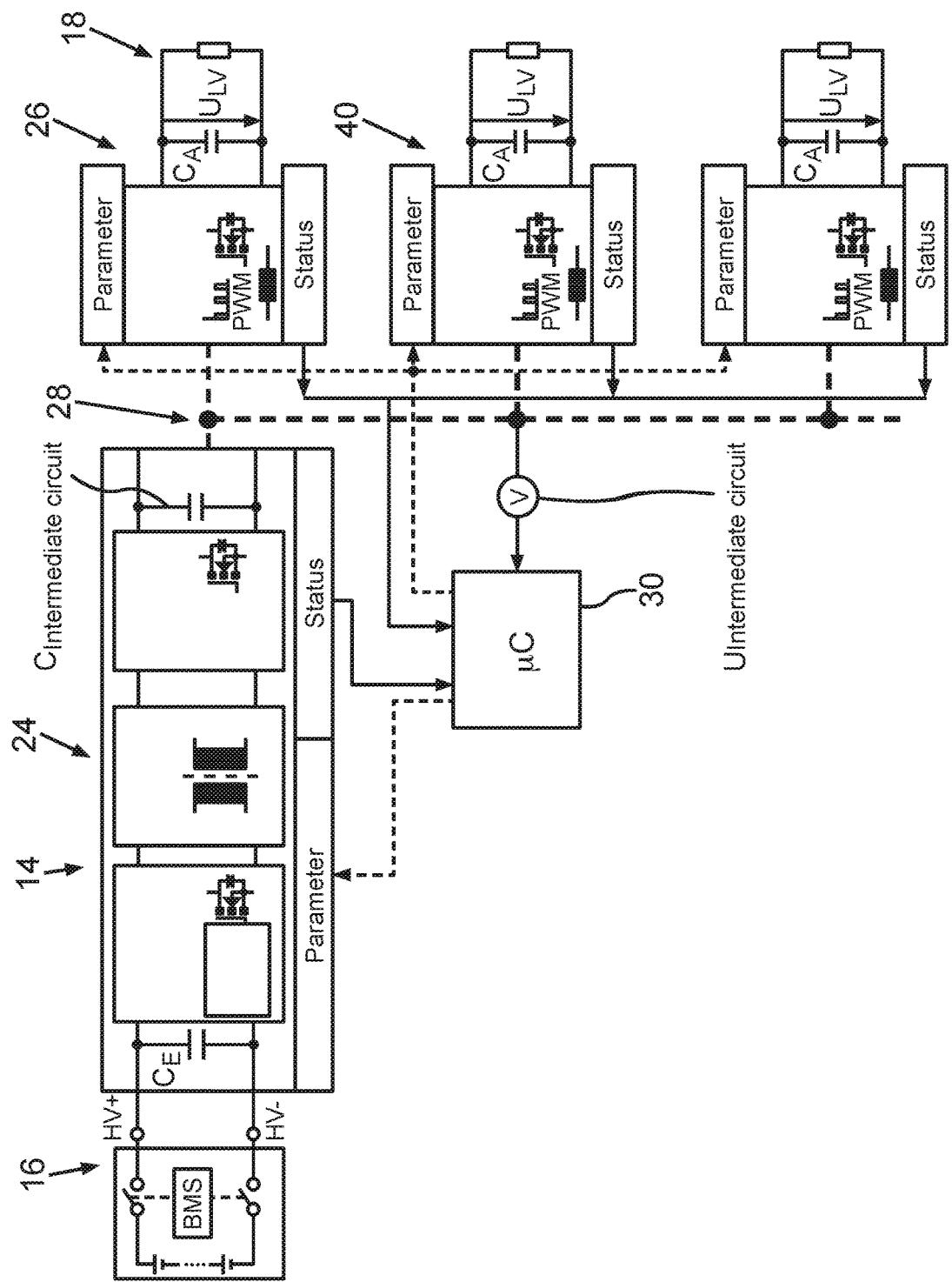
FIG. 14 in a schematic block diagram representation, another embodiment of an energy coupling device according to the invention, which is modular adaptable by adding or subtracting low-voltage converters.

FIG. 9 shows in a schematic overview representation an enhancement in the nature of a flexible DC/DC multiport converter principle, in order to make possible a further improvement or optimization. As can be seen from FIG. 10, this configuration is characterized in that a first energy converter, namely, a high-voltage energy converter 24, which preferably provides a galvanic isolation and may have a fixed or variable clock timing, is used to provide an intermediate circuit d.c. voltage 32 at a d.c. voltage intermediate circuit 28, to which a low-voltage energy converter 26 is connected in the manner of an adapter module, providing the desired d.c. voltage at a low-voltage on-board electrical system 18. The low-voltage on-board electrical system 18 in the present instance comprises the drive mechanism of the industrial truck 10, and is therefore designed for a d.c. voltage of around 80 V. Further adapter modules can be easily connected in the manner of the low-voltage energy converter 26 to the d.c. voltage intermediate circuit 28 in order to further enhance the functionality (FIG. 12, FIG. 14).

In the present instance, moreover, it is provided that the regulating of the respective d.c. voltages of the low-voltage on-board electrical systems 18 is based on the intermediate circuit d.c. voltage 32 of the d.c. voltage intermediate circuit 28. In this way, advantageous bidirectional energy transfer concepts may be achieved. At the same time, a plurality of DC/DC converters can be operated with the goal of accomplishing the most optimal possible total degree of efficiency, and the energy converters may be operated together with the high-voltage energy converter 26.

Figure 10:
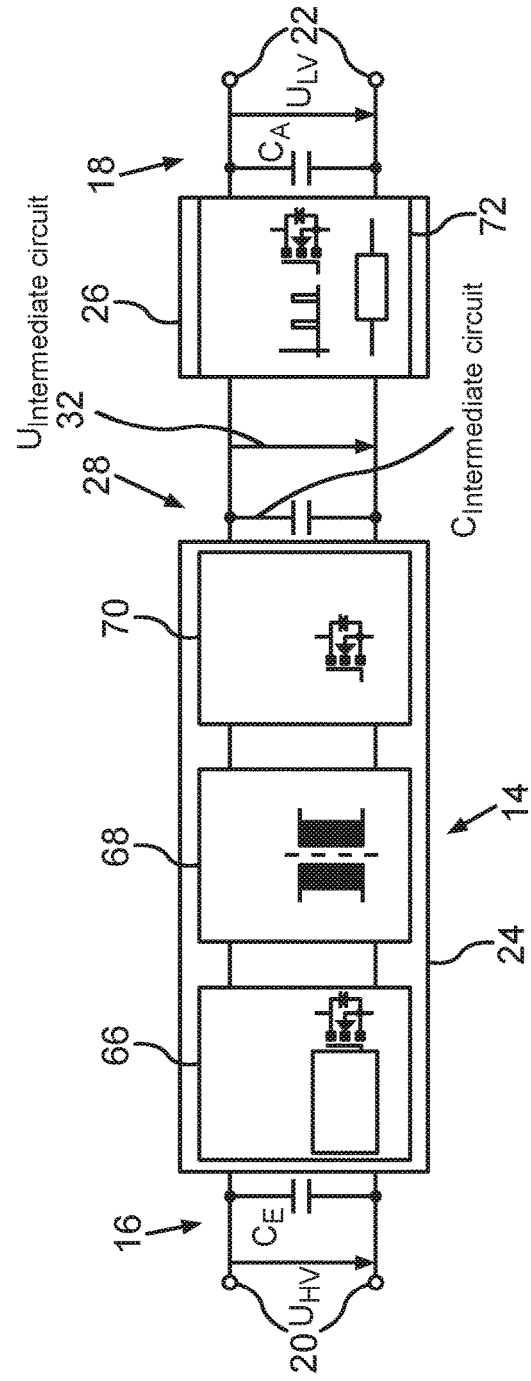
FIG. 10 a schematic block diagram for a first embodiment of the energy coupling device of FIG. 9.

FIG. 10 shows a first embodiment for the energy coupling device 14. the energy coupling device 14 of FIG. 10 serves for the electrical coupling of an on-board electrical system 16 designed for d.c. voltage, in the present case being formed by the high-voltage battery 46, to an electrical low-voltage on-board electrical system 18 designed for d.c. voltage, in the present case being formed by the drive mechanism of the industrial truck 10 of FIG. 1. The energy coupling device 14 comprises a high-voltage terminal 20 for connecting the energy coupling device 14 to the high-voltage on-board electrical system 16, a low-voltage terminal 22 for connecting the energy coupling device 14 to the low-voltage on-board electrical system 18, a high-voltage energy converter 24 connected to the high-voltage terminal 20, a low-voltage energy converter 26 connected to the low-voltage terminal 22, a d.c. voltage intermediate circuit 28, to which the high-voltage energy converter 24 and the low-voltage energy converter 26 are connected for the electrical coupling of the two energy converters, and a control unit 30 for controlling the energy converters 24, 26 (FIG. 14).

As can be seen from FIG. 10, the high-voltage energy converter 24 comprises three functional subassemblies, namely, in the present instance, a DC/AC converter 66, which is connected to the high-voltage terminal 20, a transformer 66, which is connected by a primary winding to an AC terminal of the DC/AC converter 66, as well as an AC/DC converter 70, which is connected at the alternating voltage side to a secondary winding of the transformer 68 and at the d.c. voltage side to the d.c. voltage intermediate circuit 28. In this way, it is possible to provide a preferably bidirectional energy conversion between the d.c. voltage intermediate circuit 28 and the high-voltage on-board electrical system 16, while a galvanic isolation is accomplished by means of the transformer 68. In this way, safety features provided in the area of the high-voltage battery 46 can continue to be used reliably in the nominal operation, so that the electrical safety is improved.

Connected at the d.c. voltage intermediate circuit 28, as the low-voltage energy converter 26, is a DC/DC converter 72, which provides a bidirectional coupling in the manner of a clocked energy converter between the low-voltage onboard electrical system 18 and the d.c. voltage intermediate circuit 28. In the present instance, it is provided that the intermediate circuit d.c. voltage 32 at the d.c. voltage intermediate circuit 28 is in a range which is limited by the d.c. voltage provided by the high-voltage battery 46 at the high-voltage terminal 20 and the d.c. voltage provided by the low-voltage on-board electrical system 18 at the low-voltage terminals 20. The high-voltage energy converter 24 and the low-voltage energy converter 26 are controlled accordingly by means of the control unit 30.

Figure 11:
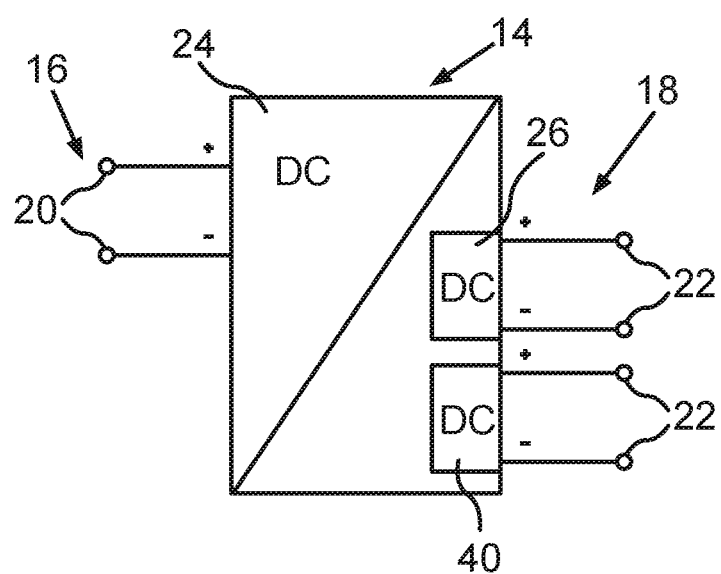
FIG. 11 a schematic principle block diagram for a second embodiment of the energy coupling device of the invention for the power connection to two low-voltage on-board electrical systems.

FIG. 11 shows an enhancement of the embodiment of FIG. 9, in which now two low-voltage energy converters 26, 40 are provided at the low voltage side, which are connected to two low-voltage on-board electrical systems 18 separated from each other with different d.c. voltages. FIG. 12 shows a corresponding block diagram representation in a schematic view, where it can be seen that the low-voltage energy converters 26, 40 are connected at the d.c. voltage side in parallel with the d.c. voltage intermediate circuit 28. In this way, it is possible to deliver energy not only from the high voltage side to the respective low-voltage on-board electrical systems 18, but also from one of the low-voltage on-board electrical systems 18 to the other of the low-voltage on-board electrical systems 18 and vice versa. The energy flow can be controlled accordingly by means of the control unit 30.

The concept of the invention makes it possible also to arrange the low-voltage energy converters 26, 40 when used in a motor vehicle in different locations of the motor vehicle, preferably where their use is required and preferably also where design space is available. Thus, this makes possible an increased flexibility especially when used in motor vehicles such as the industrial truck 10. Moreover, during reduced operation, such as when a charging operation is occurring with only 500 W of charging power, one can also economize on the cooling of the high-voltage battery 46.

Thus, the d.c. voltage intermediate circuit 28 need not be arranged in the housing 48, just as the low-voltage energy converter 26, 40.

Figure 13:
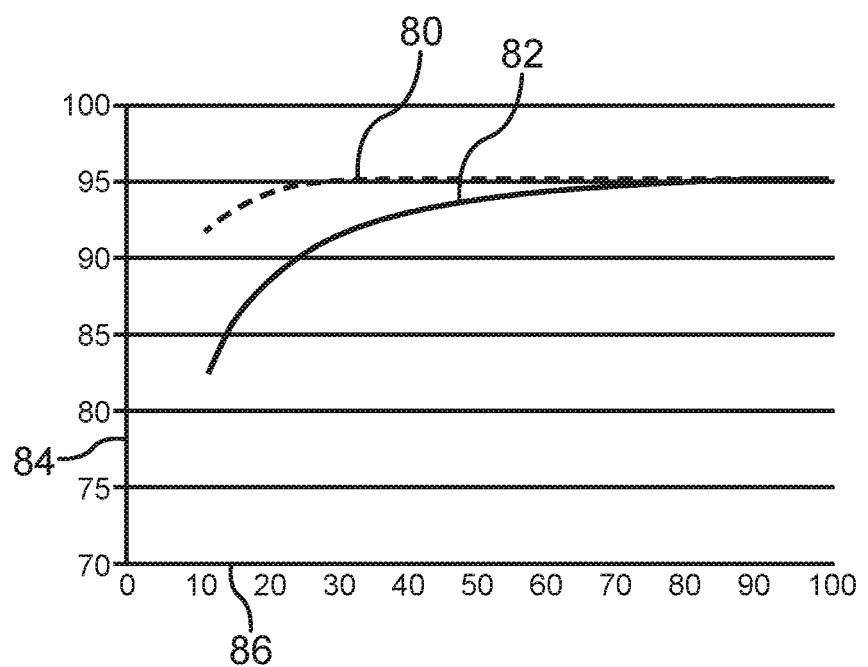
FIG. 13 in a schematic block diagram representation by means of two graphs, a plot of the degree of efficiency as a function of the capacity utilization of the energy coupling device of FIG. 9.

Due to the fact that large efficiency drops may occur, especially in the partial load range, the invention proposes that the intermediate circuit d.c. voltage 32 and optionally also a clock frequency of the energy converters 24, 26, 40 can be adapted accordingly by the control unit 30 actuating the energy converters 24, 26, 30 accordingly. FIG. 13 shows in a schematic representation the possibilities which can be accomplished with the invention in regard to improving the degree of efficiency, for example. FIG. 13 shows on the x-axis 86 the capacity utilization of the energy coupling device 14 in %. The y-axis 84 denotes the total degree of efficiency in %. The diagram of FIG. 13 shows schematically with a first graph 82 how the degree of efficiency develops during ordinary control of the energy converters 24, 26, 40. It can be seen that, starting with a capacity utilization of around 30%, the efficiency drops off strongly and falls distinctly below 90%. This not only has the disadvantage of reducing the performance overall, because energy is being lost in undesirable manner, but also it reduces the mobility, since a charging process has to be carried out more often than if the efficiency had been maintained.

The graph 80 now shows the effect on the efficiency of a control process according to the invention, where it can be seen that the total degree of efficiency is greater than the efficiency which can be achieved with the prior art already at a capacity utilization of less than 80%. The invention accomplishes this by controlling the intermediate circuit d.c. voltage 32 appropriately, so that all the degrees of efficiency of all the energy converters 24, 26, 40 are taken into account for the determining of a total degree of efficiency and this is maximized. Especially for slight capacity utilization below 40% the method of the invention proves to be advantageous, because in this way a good energy utilization can be achieved even in the partial load range. In this way, especially long operating times between consecutive charging processes can be achieved precisely in the partial load range. Thus, the invention makes possible a dynamic optimization of the efficiency and in this way it significantly improves the operating availability of the industrial truck 10.

FIG. 14 shows another embodiment of the energy coupling device 14, based on the embodiment of FIG. 12, so that reference is made in addition to the remarks for that exemplary embodiment. It can be seen from FIG. 14 that a plurality of further low-voltage energy converters like the low-voltage energy converters 26, 40 can be connected in modular fashion at the d.c. voltage intermediate circuit 28, so that the energy coupling device 14 can be adapted for a number of further applications. It is only necessary to provide appropriate slots for this, in which corresponding low-voltage energy converters can be arranged. The advantage of the efficiency-optimized control process is also evident here, because the plurality of energy converters can be optimized overall in regard to their designed operation. Furthermore, the system is extremely flexible, because it can be adapted to the most diverse operating conditions, especially also motor vehicles or industrial trucks. Thus, it is possible to easily adapt the energy coupling device 14 for an industrial truck which uses an operating voltage of 48 V. For this purpose, one need only replace the low-voltage energy converter 26 with a low-voltage energy converter designed for a corresponding d.c. voltage. Ideally, this can be done by the plug-and-play principle. Preferably no safety or type testing will need to be carried out, especially if the individual components are already tested components.

Thus, in particular, the invention make it possible to utilize the accumulators already developed for the large market of electric motor vehicles also for other applications, especially for industrial trucks such as the industrial truck 10. Thanks to the invention, a simple adaptation to the most diverse operating requirements can be achieved.

Even though the invention has been explained in the present instance with the aid of industrial trucks and this may of course also be expanded to motor vehicles in general, the invention may of course also be used equally for stationary power supply devices.

The exemplary embodiments serve solely for explaining the invention and are not meant to limit it. Furthermore, it may of course be provided that device features are formulated as method features or vice versa.

The invention claimed is:

1. An energy coupling device for the power coupling of a high-voltage on-board electrical system designed for d.c. voltage to a low-voltage on-board electrical system designed for d.c. voltage, comprising:

a high-voltage terminal for connecting the energy coupling device to the high-voltage on-board electrical system, a low-voltage terminal for connecting the energy coupling device to the low-voltage on-board electrical system, a high-voltage energy converter, connected to the high-voltage terminal, a low-voltage energy converter connected to the low-voltage terminal, a d.c. voltage intermediate circuit, to which the high-voltage energy converter and the low-voltage energy converter are connected for electrically coupling the two energy converters, and a control unit for controlling the energy converters, wherein the control unit is designed to ascertain degrees of conversion efficiency of the energy converters and to set an intermediate circuit d.c. voltage of the d.c. voltage intermediate circuit as a function of a total degree of efficiency produced by the sum of the degrees of conversion efficiency in order to maximize the total degree of efficiency.

2. The energy coupling device as claimed in claim 1, wherein the control unit is designed to regulate the low-voltage energy converter on the basis of the intermediate circuit d.c. voltage.

3. The energy coupling device as claimed in claim 1, wherein at least the low-voltage energy converter is designed as an individually manageable unit, which can be mechanically and electrically connected to the energy coupling device as a type of modular construction.

4. The energy coupling device as claimed in claim 3, wherein a housing, in which at least the high-voltage energy converter and the low-voltage energy converter are arranged and which includes at least one slot for the low-voltage energy converter for the reversible electrical and mechanical connection of the low-voltage energy converter.

5. The energy coupling device as claimed in claim 1, wherein at least one further low-voltage energy converter connectible to the d.c. voltage intermediate circuit for the electrical coupling of an outside electrical energy source.

6. A battery comprising:
a battery housing and at least two battery terminal poles arranged on the battery housing for connecting the battery to an on-board electrical system, having a plurality of battery cells that are arranged in the battery housing and that are mechanically connected to one another and electrically coupled to each other according to a specified connection diagram and are connected to the battery poles, wherein an energy coupling device as claimed in claim 1, which is arranged in the battery housing.

7. A motor vehicle comprising:
a high-voltage on-board electrical system and a low-voltage on-board electrical system, wherein an energy coupling device as claimed in claim 1, connected to the high-voltage on-board electrical system and/or to the low-voltage on-board electrical system.

8. The motor vehicle as claimed in claim 7, wherein a high-voltage energy converter and at least one low-voltage energy converter of the energy coupling device are arranged spatially at a physical distance from each other.

9. A method for operating an energy coupling device electrically coupling a high-voltage on-board electrical system designed for d.c. voltage to a low-voltage on-board electrical system designed for d.c. voltage, having a high-voltage energy converter connected to the high-voltage on-board electrical system and a low-voltage energy converter connected to the low-voltage on-board electrical system, which are electrically coupled by means of a d.c. voltage intermediate circuit, wherein the energy converters are controlled by means of a control unit, wherein the degrees of conversion efficiency of the energy converters are ascertained and an intermediate circuit d.c. voltage of the d.c. voltage intermediate circuit is set as a function of a total degree of efficiency produced by the sum of the degrees of conversion efficiency in order to maximize the total degree of efficiency.

10. The method as claimed in claim 9, wherein the control unit is used to set a clock frequency of the high-voltage energy converter and/or at least one low-voltage energy converter as a function of the intermediate circuit d.c. voltage.

11. The method as claimed in claim 9, wherein an energy flow between the energy converters is controlled by means of the control unit.

* * * * *